Patented Sept. 28, 1943

2,330,428

UNITED STATES PATENT OFFICE 2,330,428

MANUFACTURE OF CALCIUM CARBONATE-ADHESIVE COATINGS

Ausker E. Hughes, Wyandotte, Harold B. Browne, Trenton, and Howard F. Roderick, Grosse Isle, Mich., assignors, by mesne assignments, to Wyandotte Chemicals Corporation, Wyandotte, Mich., a corporation of Michigan Application October 28, 1940, Serial No. 363,154

7 Claims. (Cl. 106—148)

The present invention relates to the manufacture of a coating composed of a pigment in the form of precipitated calcium carbonate and an adhesive adapted to bind and bond such coating to the surface to which it is to be applied. The adhesive employed in our coating is selected from the group consisting of casein, starch and alpha protein. Such calcium carbonate-adhesive coatings are applied to the surface which they are intended to cover, protect, decorate, or improve by first being placed in an aqueous suspension of such consistency and viscosity that they may be spread in a covering film in either a continuous or design form upon the surface and then dried. The coating is most particularly adapted for use as a paper coating, as a cold water paint and as a water ink for the printing of wallpaper.

Calcium carbonate has previously been recognized as a desirable pigment for use in the paper coating, cold water paints, water inks for printing wallpaper and allied arts, due primarily to its low cost, high covering power and high degree of whiteness. However, calcium carbonate pigment has been subject to the practical disadvantage in its use in such arts in that it has required a relatively high proportion of adhesive, which latter ingredient is a relatively dear one as compared to the cost of the former. Thus, as high as 25 to 35% adhesive, such as casein, starch and alpha protein, ("alpha protein" being here defined as a soya bean protein extracted by alkaline treatment after removal of the oil from the crushed and pulverized soya bean), have previously been found necessary in order to produce specified degrees of adhesion of the coating film to the surface. We have discovered, through the medium of our invention, that this adhesive requirement can be reduced to as low as 8 to 12% without sacrificing the bonding strength of the coating and thus resulting in a very substantial cost savings for the coating.

The calcium carbonate pigment particularly adapted for use in the practice of our invention is of the high grade type possessing the desired fine particle size and suitably produced by a precipitation process such as more fully described and covered in Roderick U. S. Patent No. 2,164,943, issued July 4, 1939 and there are other grades of precipitated or "artificial" calcium carbonate, namely a coarse grade and a colloidal grade, which are, of course, not acceptable in the paper coating, cold water paint and ink arts and hence not regarded as within the scope of our invention. The high grade, precipitated calcium carbonate, used as an ingredient in the coating product of our invention, may be more particularly defined as having a particle size ranging from 1 to 5 microns.

Heretofore, the efforts of solving the problem of reducing the adhesive requirement for a calcium carbonate-adhesive coating of the character above described have been directed toward a treatment of the calcium carbonate alone and before its incorporation with the adhesive. Such efforts have involved the pulverizing, grinding and milling of the calcium carbonate, either in wet or dry form. The most common prior practice or manufacturing calcium carbonate-adhesive coatings has been to first prepare a water slurry of relatively thick consistency of the calcium carbonate pigment, subjecting it to a mixing action to obtain proper dispersion and finally adding adhesive and water solution and continuing the mixture for proper uniform distribution of the adhesive. We have discovered on the other hand that if the entire amount of adhesive is initially added to the calcium carbonate pigment, the latter being either in a technically dry form or in the form of very thick paste-like slurry of high consistency, that it is possible to obtain a substantial reduction in the amount of adhesive required and at the same time producing a coating having the same adhesive properties as heretofore specified for coatings manufactured from prior processes and requiring the addition of an increased amount of adhesive. We have also made the discovery that by reason of our invention the viscosity of calcium carbonate-adhesive coatings, cold water paints and water inks for design printing of wallpaper and other such commodities of commerce, is greatly reduced. This unexpected result is of particular advantage in the application of the coating to the surface to which it is to be applied because it greatly reduces the amount of water which must otherwise be added to the coating in order to render it of sufficient fluidity to enable it to be properly spread upon the surface. This reduction in the amount of water required for reducing the consistency of the coating is also beneficial in that it reduces the amount of drying required for the applied coating film.

To the accomplishment of the foregoing and related ends, said invention, then, consists of the means hereinafter fully described and particularly pointed out in the claims.

The annexed drawing and the following description set forth in detail one method and one product exemplifying our invention, such disclosed procedure and product constituting, however, but one of various applications of the principle of our invention.

Figure 1:
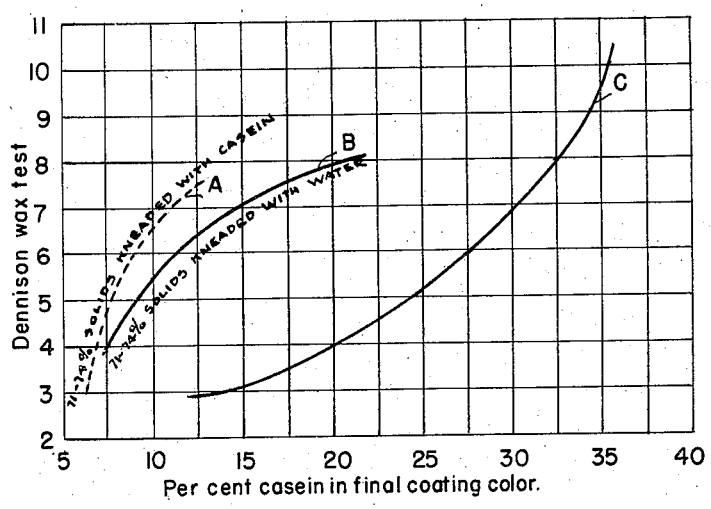
Fig. 1 is a chart showing the adhesive properties of coatings made according to the principles of our invention, and in which casein is the adhesive employed as compared to prior processes.

In the practice of our process, the high grade, precipitated calcium carbonate pigment, having a particle size of the range of 1 to 5 microns, is initially mixed with the adhesive, i. e., either casein, starch or alpha protein, and water. The water may be incorporated in this initial mixture either with the calcium carbonate in a suspension, or with the adhesive in solution, or both. The important criterion is that the total amount of water present in this initial mixture must be less than one-half the amount of calcium carbonate. Thus, technically dry calcium carbonate pigment may be mixed directly with adhesive solution and without having first dispersed the calcium carbonate pigment in water. Or, on the other hand, a slurry of calcium carbonate and water may be directly mixed with the adhesive solution.

More specifically, our process may be described as employing the procedure of first intimately mixing calcium carbonate and adhesive in water solution, in such proportions that the water content shall not be greater than 30% of the total amount of calcium carbonate and water and with the adhesive content between 8 and 12% on a dry calcium carbonate basis. This results in a mass which is of a plastic nature and which will offer considerable resistance to movement and distortion when subjected to a shearing stress. It is then subjected to such a mixing or mechanical treatment as to produce a homogeneous mixture and dispersion of the ingredients. Such a mechanical treatment due to the original paste-like consistency of the mixture, may be conveniently termed a kneading operation and is suitably conducted and carried out in a mixing apparatus such as a dough mixer, pony mixer, edge runner, roller pigment mill, rotating pan mixer, pug mill, putty chaser, and the like. During this mechanical treatment, the material changes from a partly dry, lumpy condition to a smooth, paste-like consistency of high plasticity.

After the kneading process has been completed, water is simply mixed in to produce the desired viscosity for the coating application. It is found that smaller amounts of water are required for thinning to comparable viscosities as is obtained by prior methods in the art. This lowering of viscosity is more clearly expressed in the following manner: We have discovered that when corresponding amounts of water, as normally required by other methods in the preparation of such coatings described herein, are added to the smooth viscous mass for thinning the viscosity, as expressed in centipoises and determined by a MacMichael viscosimeter, it is substantially decreased below that obtained by general methods of present practice. The reduction in viscosity of the coatings of our process containing the same total amount of water as those made by prior methods is as great as one-half. Advantages of lower viscosities with a minimum water content are readily apparent to one skilled in the art of such coatings, casein or cold water paints and water inks for design printing of wallpaper and the like.

Such a mechanical mixing treatment or kneading of the initial mixture of calcium carbonate, water and adhesive need not be continued for an extended period of time. For example, forty-five minutes kneading in a dough mixer is found to be adequate. However, the scope of our invention and claims as set forth hereinafter are in no way limited to given periods of time since the time required depends upon the efficiency and suitability of the equipment employed in the process. It is during this kneading process that desired changes take place within the thick mass which makes possible a reduction of the viscosity when the mixture is finally made into a coating by the further addition of water.

We have also discovered that the amount of proportion of adhesive required in the finished coating product to produce specified adhesive properties in the applied coating, can be substantially reduced by our process. Referring to Fig. 1, which is a diagram in which the per cent of adhesive, casein in this instance, is plotted against the "wax test" or adhesive properties of the coating, the curve A represents coatings made according to our process, viz., the kneading of plastic slurries of calcium carbonate, water and casein, and curve B represents the kneading of similar plastic slurries of calcium carbonate and water without the presence of an adhesive; the required amount being subsequently added after kneading, and curve C represents the coating made by the customary prior art process in which a relatively thin slurry of calcium carbonate and water are merely mixed with the adhesive solution, viz., a mixture in which the total amount of water is in substantial excess of that of the calcium carbonate.

Figure 2:
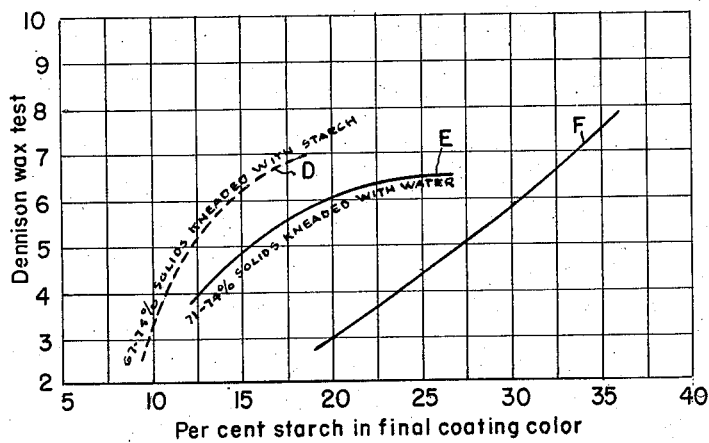
Fig. 2 is a chart similar to Fig. 1 but in which starch is the adhesive employed.
Figure 3:
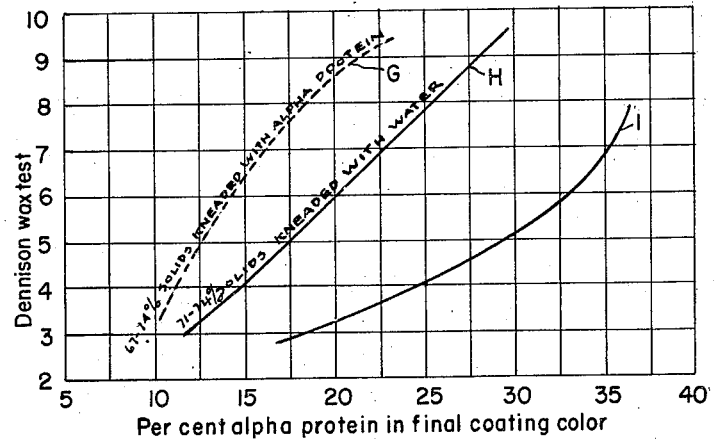
Fig. 3 is a chart similar to the foregoing, but in which alpha protein is the adhesive employed.

The vertical ordinant of Figs. 1, 2 and 3, denoted "Dennison wax test," is a measurement of the adhesive properties of the coating after its application to a paper sheet. The readings or numerical values for this Dennison wax test are determined by the use of a set of standard paper testing waxes (Dennison new series No. 120A), which waxes, when heated and allowed to cool or set while in contact with the coated paper surface, have varying degrees of adhesion. The waxes are numbered in order of their degree of adhesion and are "picked" or lifted from the coated surface, and the lowest number of the wax in the numbered series which does show coating material upon its surface after being lifted therefrom determines the "wax test" reading.

Thus a wax test number of 5 has been determined as a proper and acceptable adhesive property test for calcium carbonate coated paper. Referring to Fig. 1, and particularly curve A thereof, it will be seen that an adhesive coating made according to our process and containing slightly over 7% casein possesses the required adhesive property of a No. 5 wax test. Now referring to curve B of Fig. 1, it will be seen that a coating prepared by kneading a mixture of comparable consistency of calcium carbonate with subsequent addition of casein, requires over 9% of casein to meet the same No. 5 wax test. Thus, there results a casein requirement reduction or savings of at least 20%. It will be seen that this reduction increases in proportion to the increase of adhesive properties. Comparing the coating of our process (curve A) with the most customary prior art process (curve C) it will be seen that the reduction in casein requirement is indeed substantial, e. g. the coating of curve C requires 25% casein content as compared to 7% casein content for a No. 5 wax test. This is a 72% casein requirement reduction.

Where starch is used as an adhesive in the application of the principle of our invention, similar results follow. Referring to Fig. 2, the curve D represents the adhesive characteristics of a mixture of calcium carbonate, water and starch subjected to a kneading operation. The calcium carbonate is present in the range of 67 to 74% in this mixture. The curve E represents the adhesive properties of a coating made from a mixture of equivalent consistency, but mechanically treated or kneaded without the starch adhesive being present. Curve F represents the customary prior art practice in which a relatively thin slurry of calcium carbonate and water is mixed or stirred with subsequent addition of the starch adhesive solution.

It will be seen from Fig. 2 that a 12% starch content mixture in the coating made according to the process of curve D is sufficient to give a No. 5 wax test as compared to over 15% for the procedure of curve E and 27% for the coating made according to the procedure of curve F. The adhesive requirement savings or reduction accomplished by our method over the previously known methods of curves E and F are, therefore, over 20% and 55% respectively.

Fig. 3 shows three curves, G, H and I, which are analogous to the curves A, B and C of Fig. 1 and D, E, F of Fig. 2, respectively, but in which alpha protein has been employed as the adhesive. Thus comparing curve G with curves H and I and ascertaining the alpha protein adhesive content required to give a No. 5 wax test in the final coating, it will be found that the following contents are required: curve G, 12½%, curve H, 17½%, curve I, 29½%. The adhesive requirement savings of the coatings made by our process (curve G) over the previously known processes of curves H and I are 20 and 57%, respectively.

We have also established that the proportion of calcium carbonate to total amount of water in the mixture which is mechanically treated or kneaded according to our process, is a critical one. The calcium carbonate in the mixture with adhesive and water must be present in amount twice as much or greater than that of the water during the kneading process. The following table substantiates this fact. Mixtures of calcium carbonate, casein and water were kneaded in a dough mixer for 45 minutes. The casein content was the same in each instance, but the ratio of calcium carbonate to the total amount of water were varied over a substantial range. The wax test number of the applied coatings was taken in each instance:

tent of the kneading mixture becomes either equal to or greater than one-half that of the calcium carbonate content. In fact, for a given proportion of casein adhesive, this adhesive property of the applied coating changes from a satisfactory specification to a wholly unsatisfactory and deficient one. This same critical ratio of calcium carbonate to water applies in the cases where starch and alpha protein are employed as the adhesives.

Further pursuing the results given in the foregoing table, we have determined that in order to respond to the specification of a No. 5 wax test, a maximum amount of water on the basis of total calcium carbonate and water present in the kneading mixture is 30%.

It will also be appreciated from the foregoing table that where a slurry of calcium carbonate and water is first mixed with an adhesive solution, and then kneaded, that it is practically possible to employ such a slurry of as low as 74.0% consistency, viz., 100 parts of calcium carbonate and 35 parts of water, provided that the additional water added to the mixture, along with the adhesive solution, is less than that amount required to bring the total water content up to or greater than one-half that of the calcium carbonate. Thus, in such an instance of mixing a 74.0% consistency calcium carbonate water slurry with casein solution to 8 parts of casein, the latter should not contain more than 5 parts of water.

We are unable, at present, to ascribe any scientific theory for the above described novel results achieved by reason of our invention. It is believed that in the case of kneading slurries, described in the foregoing, containing calcium carbonate, water and adhesive, that the adhesive in solution possesses the property of selectively attaching itself to the individual particles of calcium carbonate, or, alternatively, of joining with the excess water in the mixture. The mechanical kneading of the mixture imparts such mechanical stresses upon the particles of calcium carbonate as to so disperse them and bring them into contact with the adhesive in solution. It is believed that where the quantity of these particles are present to such an extent as to afford a greater opportunity for the adhesive to join or contact with them rather than being mixed into solution with the excess water, then the novel and beneficial results of this phase of our invention ensue. The foregoing theoretical hypothesis is set forth by way of possible academic explanation rather than actual fact. It is not intended that the scope of our invention be in any wise limited thereby.

Other modes of applying the principle of our invention may be employed instead of the one explained, change being made as regards the product and method herein disclosed, provided

| Per cent solids in slurry | Per cent H₂O of total CaCO₃+ H₂O | Kneading formula (parts) | Ratio CaCO₃ to total H₂O | Wax test No. |
|---|---|---|---|---|
| 75.7 | 24.3 | 100 CaCO₃, 8 casein, 32 H₂O | 3.12 to 1 | 5.0-6.0 |
| 74.0 | 26.0 | 100 CaCO₃, 8 casein, 35 H₂O | 2.86 to 1 | 5.0-6.0 |
| 71.4 | 28.6 | 100 CaCO₃, 8 casein, 40 H₂O | 2.50 to 1 | 5.0-6.0 |
| 66.6 | 33.4 | 100 CaCO₃, 8 casein, 50 H₂O | 2.00 to 1 | 0-2.0 |
| 62.5 | 37.5 | 100 CaCO₃, 8 casein, 60 H₂O | 1.67 to 1 | 0-2.0 |
| 58.8 | 41.2 | 100 CaCO₃, 8 casein, 70 H₂O | 1.43 to 1 | 0-2.0 |

From the foregoing table it will be seen that there is an unusual change in the adhesive property of the coatings when the water conthe step or steps stated by any of the following claims or the equivalent of such stated step or steps be employed.

We therefore particularly point out and distinctly claim as our invention:

1. The method of making calcium carbonate-adhesive base for coatings which when diluted with water to a coating consistency and applied to paper and dried produce a Dennison wax test of at least 5, comprising the steps of providing a slurry of calcium carbonate having a particle size of 1 to 5 microns, adding casein solution in which the amount of casein present on a dry basis is not more than 8% of the calcium carbonate, and the water in said casein solution is less than that required to produce a total water content of not over 30% of the total calcium carbonate and water content of the mixture, and then subjecting such mixture to kneading to produce a homogeneous mixture of high plasticity.

2. The method of making calcium carbonate-adhesive base for coatings which when diluted with water to a coating consistency and applied to paper and dried produce a Dennison wax test of at least 5, comprising the steps of providing a thick paste-like slurry of calcium carbonate having a particle size of 1 to 5 microns, adding alpha protein solution in which the amount of alpha protein present on a dry basis is not more than 12½% of the calcium carbonate, and the water in said alpha protein solution is less than that required to produce a total water content of not over 30% of the total calcium carbonate and water content of the mixture, and then kneading such mixture to produce a homogeneous mixture of high plasticity.

3. A calcium carbonate-adhesive homogeneous base for coating paper capable upon dilution with water to a coating consistency of producing a Dennison wax test of at least 5, consisting of finely divided, non-colloidal, chemically precipitated calcium carbonate having a particle size of 1 to 5 microns kneaded with not over 8% casein on the dry weight basis of $CaCO_3$ and less than 30% water on the basis of total calcium carbonate and water.

4. A calcium carbonate-adhesive homogeneous base of high plasticity for coating paper capable upon dilution with water to a coating consistency of producing a Dennison wax test of at least 5, comprising finely divided, non-colloidal, chemically precipitated calcium carbonate having a particle size of 1 to 5 microns kneaded with not over 12½% alpha protein on the dry weight basis of $CaCO_3$ and less than 30% water on the basis of total calcium carbonate and water.

5. The method of making calcium carbonate-adhesive coating base comprising the steps of mixing together finely-divided, non-colloidal, chemically precipitated calcium carbonate, adhesive and water wherein the water content is not over 30% of the total amount of calcium carbonate and water present, said adhesive being selected from the group consisting of casein and alpha protein, and then kneading such mixture to produce a homogeneous mixture of high plasticity, such selected adhesive being present in an amount substantially less than that required for a predetermined adhesive value as determined by the Dennison wax test in the final coating wherein such calcium carbonate and water alone in the same amounts are subjected to an equivalent kneading.

6. The method of making calcium carbonate-adhesive coating base comprising the steps of providing a thick, paste-like slurry of finely-divided, non-colloidal, chemically precipitated calcium carbonate, adding adhesive solution thereto, such adhesive being selected from the group consisting of casein and alpha protein, the amount of water in said adhesive solution being less than that required to produce a total water content of not over 30% of the total calcium carbonate and water present in the mixture, and then kneading such mixture to produce a homogeneous mixture of high plasticity, such selected adhesive being present in an amount substantially less than that required for a predetermined adhesion value as determined by the Dennison wax test in the final coating wherein such calcium carbonate and water alone in the same amounts are subjected to an equivalent kneading.

7. The method of making calcium carbonate-adhesive base for coatings, which when diluted with water to a coating consistency and applied to paper and dried will produce a Dennison wax test of at least 5, comprising mixing chemically precipitated calcium carbonate having a particle size of 1 to 5 microns, adhesive and water, such adhesive being selected from the group consisting of casein and alpha protein, and in an amount of not more than 8% on a dry basis of the calcium carbonate, and wherein the water content is not over 30% of the total amount of calcium carbonate and water present, and kneading such mixture, to produce a homogeneous mixture of high plasticity.

AUSKER E. HUGHES.
HAROLD B. BROWNE.
HOWARD F. RODERICK.